W. STRAIT.
TRACTION MACHINE.
APPLICATION FILED NOV. 4, 1916.
1,353,617.
Patented Sept. 21, 1920.
2 SHEETS—SHEET 2.
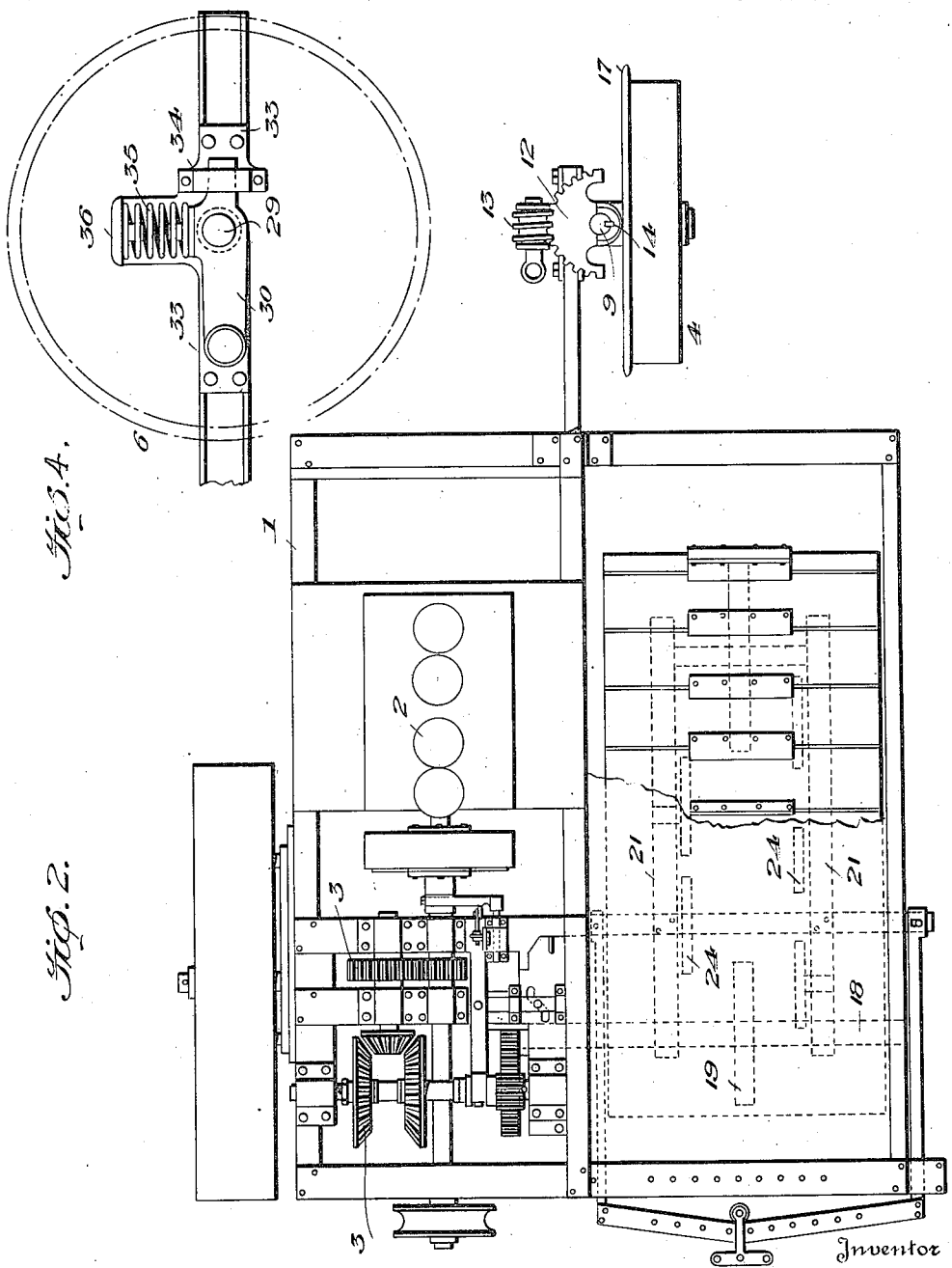

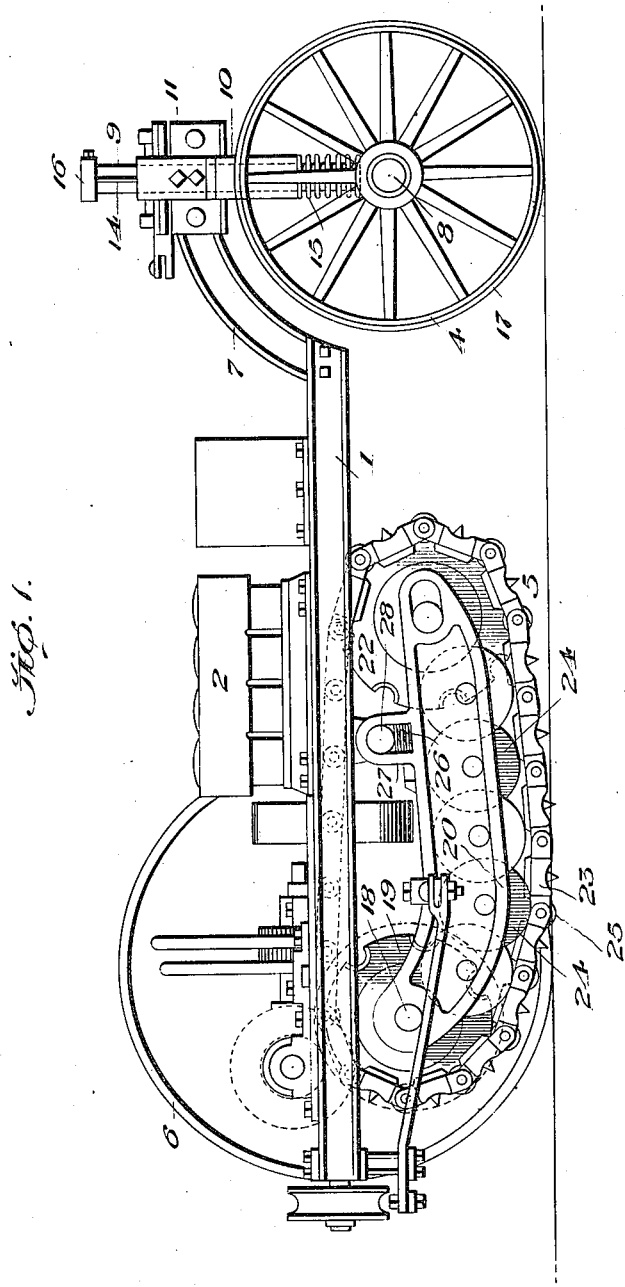

UNITED STATES PATENT OFFICE.

WILLIAM STRAIT, OF APPLETON, WISCONSIN, ASSIGNOR TO THE CLEVELAND TRACTOR COMPANY, OF EUCLID, OHIO, A CORPORATION OF OHIO.

TRACTION-MACHINE.

1,353,617.    Specification of Letters Patent.    Patented Sept. 21, 1920.

Original application filed December 10, 1913, Serial No. 805,767. Divided and this application filed November 4, 1916. Serial No. 129,554.

*To all whom it may concern:*

Be it known that I, WILLIAM STRAIT, a citizen of the United States, residing at Appleton, Wisconsin, have invented certain new and useful Improvements in Traction-Machines, of which the following is a specification.

This is a division of my application, Serial Number 805,767, filed December 10, 1913, for traction machines, which application has matured into Patent No. 1,237,970, Aug. 21, 1917.

The present invention provides a new and improved chassis construction for tractors, comprising a spring mounted steering unit and one or more flexibly arranged driving tractor units suitably connected by the main frame. The invention also provides in a preferred construction, where one driving tractor unit is employed, a flexibly mounted wheel to form, in conjunction with the tractor unit and the steering unit, a third point of support for the chassis.

The accompanying drawing shows certain exemplifying embodiments of the invention, but it is to be understood that the invention is capable of embodiment in other forms, and I do not limit myself to details except as claimed.

Figure 1 is a side elevation of a tractor chassis embodying the invention.

Fig. 2 is a plan of the same.

Fig. 3 is a horizontal sectional detail of the supporting wheel, sometimes called an idler.

Fig. 4 is a detail in side elevation of the same.

Referring first to Figs. 1 and 2, the main frame 1 carries the motor 2 and other necessary mechanism, such as transmission gearing 3. The front end of the chassis frame is supported by a spring mounted steering unit, which in this embodiment is a wheel 4. Near the rear end, the frame is supported partially by a flexibly mounted driving tractor unit 5, and where only a single driving tractor unit is employed the frame is additionally balanced and supported by a flexibly mounted wheel 6, which may sometimes be called an idler or idler ground wheel.

Steering wheel 4 is carried by a forward extension 7 on the main frame. This is preferably curved upward, as shown in Fig. 1, to provide ample room for turning the wheel. The wheel axis 8 is carried at the lower end of a stem 9 and this stem extends up through a bearing sleeve 10 connected to the frame extension. Above bearing 10 is mounted the gear sleeve 11 carrying a segmental worm gear 12. This is engaged by a steering worm 13 mounted in suitable bearings carried by the frame. A suitable steering hand wheel and connections (not shown) are to be provided. Stem 9 has a splined connection 14 with the segmental gear 12 so that stem 9 is caused to turn in accordance with the movement of the gear and may slide up and down in relation thereto, and also in relation to the bearing sleeve 10. Between sleeve 10 and shaft 8, stem 9 is surrounded by a spring 15 which serves to absorb ground shocks. A stop, such as the collar 16, may be bolted to the top of the stem to limit the downward movement thereof.

By this arrangement the front end of the machine is always supported flexibly by spring 15. At the same time steering engagement of the wheel 4 with the ground is maintained in spite of upward tilting of the front end of the machine which often occurs when the machine runs over rough ground and balances upon the driving tractor 5 and other rear supporting devices in such a way as to elevate the front part of the machine. In this case the stem 9 of the steering unit slides down through bearing sleeve 10 and through the sleeve of the steering gear sector, and the steering wheel 4 thus remains in steering engagement with the ground. To increase the ground contact of the wheel for steering, it may be, if desired, provided with a flange 17.

The transmission gearing 3 impels a driving shaft 18 which is supported in the frame on suitable bearings. This shaft carries a driving sprocket 19 for the tractor belt. The driving tractor unit comprises a frame 20 consisting in this embodiment of side members 21 located at either side of the driving sprocket 19. The tractor frame is flexibly mounted in relation to the main frame usually by pivoting the tractor frame to the main frame near the rear end of the former. The pivot connection is also usually made near the axis of the driving shaft 18 and in this particular embodiment the tractor frame is actually pivoted about the axis of this shaft. Near its front end the tractor frame carries an idler pulley or sprocket 22 and the tractor belt 23 passes about this idler and the driving sprocket 19. The lower or ground stretch of the belt is further guided and supported by idler wheels 24 mounted on suitable bearings in the tractor frame and staggered in relation to each other, as indicated in Fig. 2. The idler wheels 24 are arranged so that the ground stretch of the belt has a downward projection or bulge. The shape of this curvature of the belt may vary, but when suitably arranged a fulcrum or normal ground contact point 25 is produced in the belt near, but somewhat in front of the driving sprocket 19. In this embodiment the entire lower stretch of the belt shows a curvature and this is desirable in many cases but is not essential. The bottom of driving sprocket 19 is also elevated considerably above the ground so that it will not bear any load except in the most abnormal cases. The relatively long forward overhanging part of the tractor unit tends to balance and flexibly support the main frame upon the ground fulcrum 25. The forward end of the tractor frame may further be supported by springs 26 carried in housings 27 on the tractor frame and bearing against a bar 28 carried by the main frame and passing through the housings.

The construction and arrangement of the tractor unit is more fully described in my previous application above mentioned, to which reference should be made. The present application is not intended to cover details of the tractor, and the present description is therefore only sufficient to show its coöperation with other features of the chassis arrangement.

When a single driving tractor is used, as in Figs. 1 and 2, a supporting idler or wheel 6 is conveniently employed at the opposite side of the machine near the rear. This wheel has an axle 29 carried by an arm 30 pivoted to the main frame by means of a sleeve 31 journaled upon a stud shaft 32 carried by the frame. The arm 30 swings alongside of a plate 33 carried by the main frame and the free end of the arm is guided and limited in movement by a strap or clip 34, which, at its ends, is bolted to plate 33 and provides a guide slot or arc of limited extent for the play of the free end of arm 30. A spring 35 is located between arm 30 and a spring seat 36 carried by a plate 33 to flexibly support the arm. The wheel 6, as a rule, is of unusually large diameter and is also of suitable width to provide ample ground contact. A traction machine constituted as described has, in effect, three ground supports consisting of the bottoms of wheels 4 and 6 and the shifting ground contact portion of the tractor unit 5. This three point support enables it to balance easily and correctly upon almost any ground surface. The flexible and spring support of the tractor unit enables it to conform to the ground surface while providing very effective traction, and affords an effective spring support for the main frame. At the opposite side the swinging spring mounting of the idler wheel 6 also provides a very simple and effective spring support for the main frame, while at the front the sliding and spring mounting of the steering spindle provides for keeping the steering wheel 4 in its steering engagement with the ground at all times, and also provides at all times an effective spring support for the front end of the machine.

I claim:—

1. In a traction machine, the combination of a main frame, a driving tractor pivoted near one of its ends as a unit in relation to the main frame, a steering unit pivotally mounted for steering in respect to the main frame, and spring mechanism supporting the main frame upon said steering unit.

2. The same as claim 1, with the addition of a ground-engaging belt comprised in said driving tractor unit, driving connections for said belt, and means for maintaining a bulge in the ground stretch of said belt.

3. In a traction machine, the combination of a main frame, driving means, a ground-engaging steering device, a spring intermediate said device and the frame, and a movable connection between the frame and steering device to permit the latter to be turned for steering and also to move vertically in relation to the frame beyond the limit of the spring movement.

4. In a traction machine, the combination of a main frame, driving means, a ground-engaging steering device, means for turning said device for steering, a movable connection between the frame and the steering device to permit the latter to move vertically in relation to the frame to maintain steering contact with the ground, and spring means intermediate the frame and steering device constructed and arranged to act when the frame is in its lower positions in relation to the steering device.

5. In a traction machine, the combination of a main frame, driving means, a ground-engaging steering member, a stem carrying said steering member, and a rotary and sliding mounting for the stem in the main frame to permit the front end of the main frame to rise and fall while the steering member maintains steering contact with the ground.

6. In a traction machine, the combination of a main frame, a driving tractor, a ground-engaging steering member near one end of the frame, a stem carrying the steering member, and a rotary and sliding mounting for the stem in the main frame to permit the front end of the main frame to rise and fall while the steering member maintains steering contact with the ground, and spring means intermediate the steering member and the main frame.

7. In a traction machine, the combination of a main frame, a driving tractor pivoted to the main frame near the rear end thereof, a ground-engaging steering member near the front end of the main frame, a steering stem carrying said steering member, a sliding connection between said stem and the main frame to permit the latter to rise and fall in relation to the stem, and means for rotating the stem for steering irrespective of the relative vertical position of the frame and stem.

8. In a traction machine, the combination of a main frame, a driving tractor pivoted to the main frame near the rear end thereof, a ground-engaging steering member near the front end of the main frame, a steering stem carrying said steering member, a sliding connection between said stem and the main frame to permit the latter to rise and fall in relation to the stem, means for rotating the stem for steering irrespective of the relative vertical position of the frame and stem, and a spring intermediate the steering member and the main frame.

9. In a traction machine, the combination of a main frame, a driving tractor pivoted to the main frame near the rear end thereof, a ground-engaging steering member near the forward end of the main frame and substantially in line with said tractor, a steering stem having a shaft at its lower end carrying said steering member, a sliding connection between said stem and the main frame to permit the main frame to rise and fall in relation to the stem, means for rotating the stem irrespective of the relative vertical position of the frame and stem, and a spring to take up ground shocks when the frame approaches its lowermost position in relation to the stem.

10. In a traction machine, the combination of a main frame, driving means, a steering wheel, a stem carrying said wheel, and a rotary and sliding mounting for the stem in the main frame to permit the adjacent end of the frame to rise and fall while the steering wheel maintains steering contact with the ground.

11. In a traction machine, the combination of a main frame, a driving tractor, a steering wheel near the front end of the frame, a stem carrying said wheel and a rotary and sliding mounting for the stem in the main frame to permit the adjacent end of the frame to rise and fall while the steering wheel maintains steering contact with the ground, and spring means intermediate the steering wheel and the frame.

12. In a traction machine, the combination of a main frame, a driving tractor pivoted to the main frame near the rear, a steering wheel near the front end of the frame and substantially in line with said tractor, a steering stem having a shaft at its lower end carrying said wheel, a sliding connection between said stem and the main frame to permit the main frame to rise and fall in relation to the stem, and means for rotating the stem in any of its positions in relation to the main frame.

13. In a traction machine, the combination of a main frame, a driving tractor pivoted to the main frame near the rear, a steering wheel near the forward end of the frame and substantially in line with said tractor, a steering stem having a shaft at its lower end carrying said wheel, a sliding connection between said stem and main frame to permit the frame to rise and fall in relation to the stem, means for rotating the stem in any of its positions in relation to the main frame, and a spring to take up ground shocks when the frame approaches its lowermost positions in relation to the stem.

14. In a traction machine, the combination of a main frame, driving traction means, a supporting, ground-engaging unit, an arm carrying said unit and pivoted to the frame, and a spring intermediate the arm and frame.

15. In a traction machine, the combination of a main frame, driving traction means, a supporting, ground-engaging unit, an arm carrying said unit and pivoted to the frame, a spring intermediate the arm and frame, and guiding means, to support the arm laterally while permitting it to swing vertically.

16. In a traction machine, the combination of a main frame, a tractor unit having an oscillating connection with said frame near one side thereof, a supporting wheel near the opposite side of the frame, and spring means intermediate said supporting wheel and main frame.

17. In a traction machine, the combination of a main frame, a tractor near one side and end thereof flexibly connected to the frame and having a ground fulcrum point relatively near one end of said tractor, a supporting wheel near the opposite side of the frame, and a steering wheel near the opposite end of the frame.

18. In a traction machine, the combination of a main frame, a tractor near one side thereof flexibly connected to the frame and having a ground fulcrum point relatively near one end of said tractor, a supporting wheel near the opposite side of the frame, a steering wheel near the opposite end of the frame, and spring means intermediate the frame and the supporting wheel.

19. In a traction machine, the combination of a main frame, a tractor unit pivoted to said frame at one side thereof, a supporting wheel at the opposite side of the frame, spring means intermediate said supporting wheel and the frame, a steering wheel at the front of the frame, and spring means intermediate said steering wheel and the main frame.

WILLIAM STRAIT.